United States Patent
Uwira

Patent Number: 5,519,206
Date of Patent: May 21, 1996

[54] MICRO-MECHANICAL MIRROR ARRAY AND OPTICAL IMAGING ASSEMBLY FOR IMPROVED PICTURE RESOLUTION

[75] Inventor: Bernd Uwira, Konstanz, Germany

[73] Assignee: Bodenseewerk Gerätetechnik GmbH, Germany

[21] Appl. No.: 328,428

[22] Filed: Oct. 25, 1994

[30] Foreign Application Priority Data

Oct. 29, 1993 [DE] Germany .................. 43 37 047.0

[51] Int. Cl.⁶ .................................................. H01J 40/14
[52] U.S. Cl. ........................................ 250/208.1; 359/247
[58] Field of Search ............................. 250/208.1, 203.1, 250/203.6, 230, 232; 356/141.3, 141.4, 152.2, 152.3; 359/247, 297, 291, 244; 244/3.13, 3.16

[56] References Cited

U.S. PATENT DOCUMENTS

| | | | |
|---|---|---|---|
| 4,656,349 | 4/1987 | Pinson et al. .............. | 250/203.1 |
| 5,107,369 | 4/1992 | Hendrickson et al. ....... | 250/203.1 |
| 5,415,156 | 5/1995 | Stirbl et al. ................ | 126/683 |

*Primary Examiner*—Edward P. Westin
*Assistant Examiner*—Que T. Le
*Attorney, Agent, or Firm*—Lee, Mann, Smith, McWilliams, Sweeney & Ohlson

[57] ABSTRACT

A passive, picture-resolving detector assembly has a matrix detector (32) and an imaging optical device (16,30) for forming an image of an object scene on the matrix detector. The matrix detector includes a two-dimensional array of detector elements (50) and each of the detector elements (50) is arranged to receive, in cyclic succession, a plurality of picture elements of the image in order to improve resolution. A micro-mechanical mirror array (18) having a two-dimensional array of mirror elements (48) is provided and each of the mirror elements (48) is arranged to be alternatively moved, by control signals applied thereto, into a first operative position or into a second operative position. The imaging optical device comprises a first imaging optical system (16) having a beam axis and arranged to form a high-resolution image of the object scene on the micro-mechanical mirror array (18). The imaging optical device, furthermore, comprises a second imaging optical system (30) arranged to image the micro-mechanical mirror array (18) on the matrix detector (32) such that each detector element (50) receives light from an associated sub-matrix (48) of the micro-mechanical mirror array (18), each such associated sub-matrix (48) including a plurality of mirror elements (56). The mirror elements (56) are arranged to deflect, in the first operative position thereof, light received from the first imaging optical system (16) past the matrix detector (32) and, in the second operative position thereof, the light received from the first imaging optical system onto the respective associated detector element (50) of the matrix detector. The micro-mechanical mirror array (18) is controllable such as to move, in cyclic succession, predetermined ones of the mirror elements (56) of the sub-matrices into the second operative position and the remaining mirrors of the sub-matrix (48) into the first operative position.

5 Claims, 3 Drawing Sheets

MICRO-MECHANICAL MIRROR ARRAY AND OPTICAL IMAGING ASSEMBLY FOR IMPROVED PICTURE RESOLUTION

BACKGROUND OF THE INVENTION

The present invention relates to a new and improved construction of a passive picture-resolving detector assembly.

In its more specific aspects, the present invention particularly relates to a new and improved construction of a passive picture-resolving detector assembly comprising a matrix detector and imaging optical means for forming an image of an object scene on the matrix detector. The matrix detector includes a two-dimensional array of detector elements each of which receives, in cyclic succession, a plurality of picture elements of such image in order to improve resolution.

Such picture-resolving detector assemblies are used, for example, for steering target tracking missiles towards a detected target or in end phase-steered munition. The matrix detector responds to infrared radiation which emanates from a target within an object scene. The matrix detector provides a raster of picture elements (pixels). These picture elements are subjected to picture processing in order to detect and identify a target and to determine the target deviation from the center of the field of view of the detector assembly. In order to reduce noise to an acceptable value, the matrix detector must be cooled down to a very low temperature by means of a cooler.

It is desirable, on the one hand, to cover a field of view as large as possible by the matrix detector in order to also detect targets having rather large target deviation. On the other hand, a geometric resolution as high as possible is required. Also, if the distance to the target is large, adequate resolution of the target structures must be possible. Thereby, identification of the target is to be facilitated and the false alarm rate, i.e. the probability of false classification of the target, is to be reduced.

In the infrared wavelength ranges of 3 to 5 µm and 8 to 12 µm used here, optical systems can be designed to be diffraction limited. Therefore, the optical systems provide high-resolution picture information. It presents, however, problems to construct a matrix detector which is capable of transferring this high-resolution picture information with least possible loss to the picture processing system. The quality of the system is determined by the modulation transfer function of the detector elements of the matrix detector. The modulation transfer function represents the capability of the detector elements of the matrix detector to scan structural information without deterioration.

Ideally, very large detector arrays having, for example, 1024 ×1024 detector elements should be used in order to take advantage of the full power of the imaging optical system. Such detectors, however, are not available.

From, for example, European Patent No. 0,133,890, granted Jan. 11, 1989, there is known an electro-optical detector system for generating electronic picture information using a charge coupled matrix detector which consists of an array of rows and columns of square detector elements. Interstices between the detector elements have a width which substantially corresponds to the side lengths of the detector elements. By means of a wobbling mirror, which can be advanced successively to four positions and which reflects the imaging path of rays, an image of an object scene is stepwisely moved relative to the matrix detector along a square trajectory. Thereby, each detector element detects, in cyclic succession, four adjacent areas of the image of the object scene. In a computer, the picture information is then composed to form a continuous "picture". By means of this image shift the resolution of the matrix detector is improved which resolution otherwise would be limited by the spacing between the detector elements. Using such structure of the detector assembly, a picture sensor of effectively 1024×1024 detector elements could be realized with no more than 256×256 detector elements. This would be within the range of the technologically possible.

At a side length of 20 µm which is the limit of what can be technologically accomplished, such matrix detector would result in a detector chip of at least 30 mm diameter. The cooling of such detector chip down to typically 80 to 100K in a missile seeker head is very expensive when employing available cooling techniques. In addition, the matrix detector would have to be manufactured from individual detector elements. This is uneconomic and expensive.

"Micro-mechanical mirror arrays" are known. Such micro-mechanical mirror arrays consist of a multitude of contiguous mirror elements. The mirror elements have a size of typically 20×20 µm. Using binary control, the mirror elements can be moved into a respective one of two operative positions. These mirror arrays are made by means of silicon chip technology. One construction of such micro-mechanical mirror arrays is commercially available from Texas Instruments Inc. and called "Digital Micromirror Device DMD".

SUMMARY OF THE INVENTION

Therefore, with the foregoing in mind it is a primary object of the invention to provide a new and improved construction of a passive picture-resolving detector assembly which is not afflicted with the drawbacks and limitations of the prior art constructions heretofore discussed.

Another and more specific object of the invention is directed to the provision of a new and improved construction of a passive picture-resolving detector assembly which has a comparatively large field of view.

It is a further significant object of the invention to provide a new and improved construction of a passive picture-resolving detector assembly which has high geometrical resolution.

A further important object of the invention is directed to providing a new and improved construction of a passive picture-resolving detector assembly which is distinguished by a large field of view and high geometrical resolution and which is suitable for use with an infrared seeker head for a target tracking missile.

A still further object of the invention is concerned with the provision of a new and improved construction of a passive picture-resolving detector assembly which has a large field of view and high-resolution and which can be constructed using presently available technology.

Now in order to implement these and still further objects of the invention, which will become more readily apparent as the description proceeds, the passive picture-resolving detector assembly of the present development is manifested by the features that, among other things, (a) a micro-mechanical mirror array having a two-dimensional array of mirror elements is provided, each of the mirror elements being arranged to be alternatively moved, by control signals applied thereto, into a first operative position or into a second operative position, (b) the imaging optical means comprise a first imaging optical system having a beam axis and arranged to form a high-resolution image of the object scene on the micro-mechanical mirror array, (c) the imaging optical means, furthermore, comprise a second imaging optical system arranged to image the micro-mechanical mirror array on the matrix detector such that each detector element receives light from an associated sub-matrix of the micro-mechanical mirror array, each such associated sub-matrix including a plurality of mirror elements, (d) the mirror elements are arranged to reflect, in the first operative position thereof, light received from the first imaging optical system past the matrix detector and to reflect, in the second operative position thereof, the light received from the first imaging optical system onto the respective associated detector element of the matrix detector, and (e) the micro-mechanical mirror array is controlled to move, in cyclic succession, each of the mirror elements successively into the second operative position, the respective remaining mirror elements of each sub-matrix being in their first operative positions.

Thus imaging of the object scene on the matrix detector is effected by way of an intermediate image, which is formed on a micro-mechanical mirror array. This micro-mechanical mirror array may be a "Digital Micromirror Device" available from Texas Instruments Inc., as mentioned above. Such mirror arrays can be constructed with 1024×1024 or 2048×2048 mirror elements. The mirror array can have larger dimensions than the matrix detector. It need not to be cooled. Sub-matrices of, for example, 4×4 or 8×8 mirror elements are defined on the mirror array. Each sub-matrix is associated with a particular detector element of the matrix detector and vice versa. The mirror array is imaged on the matrix detector, each sub-matrix being imaged on its associated detector element. A respective one of the mirror elements of each sub-matrix is tilted into its second position and directs the received light onto the associated detector element of the matrix detector. The respective remaining mirror elements are in their first operative positions, whereby they direct the impinging light past the matrix detector. The sub-matrix is now energized cyclically to successively tilt each of the mirror elements once into its second operative position, whereby this detector element directs its received light to the detector element, the remaining mirror elements being in their first operative positions. Then a comparatively small matrix detector having a limited number of detector elements can be used, which can be manufactured in practice and can be cooled with available coolers. The computer then provides from the received picture data a "picture" of increased resolution.

BRIEF DESCRIPTION OF THE DRAWINGS

The invention will be better understood and objects other than those set forth above, will become apparent when consideration is given to the following detailed description thereof. Such description makes reference to the annexed drawings wherein the same or analogous components are designated by the same reference characters and wherein.

DETAILED DESCRIPTION OF THE PREFERRED EMBODIMENTS

Figure 1:
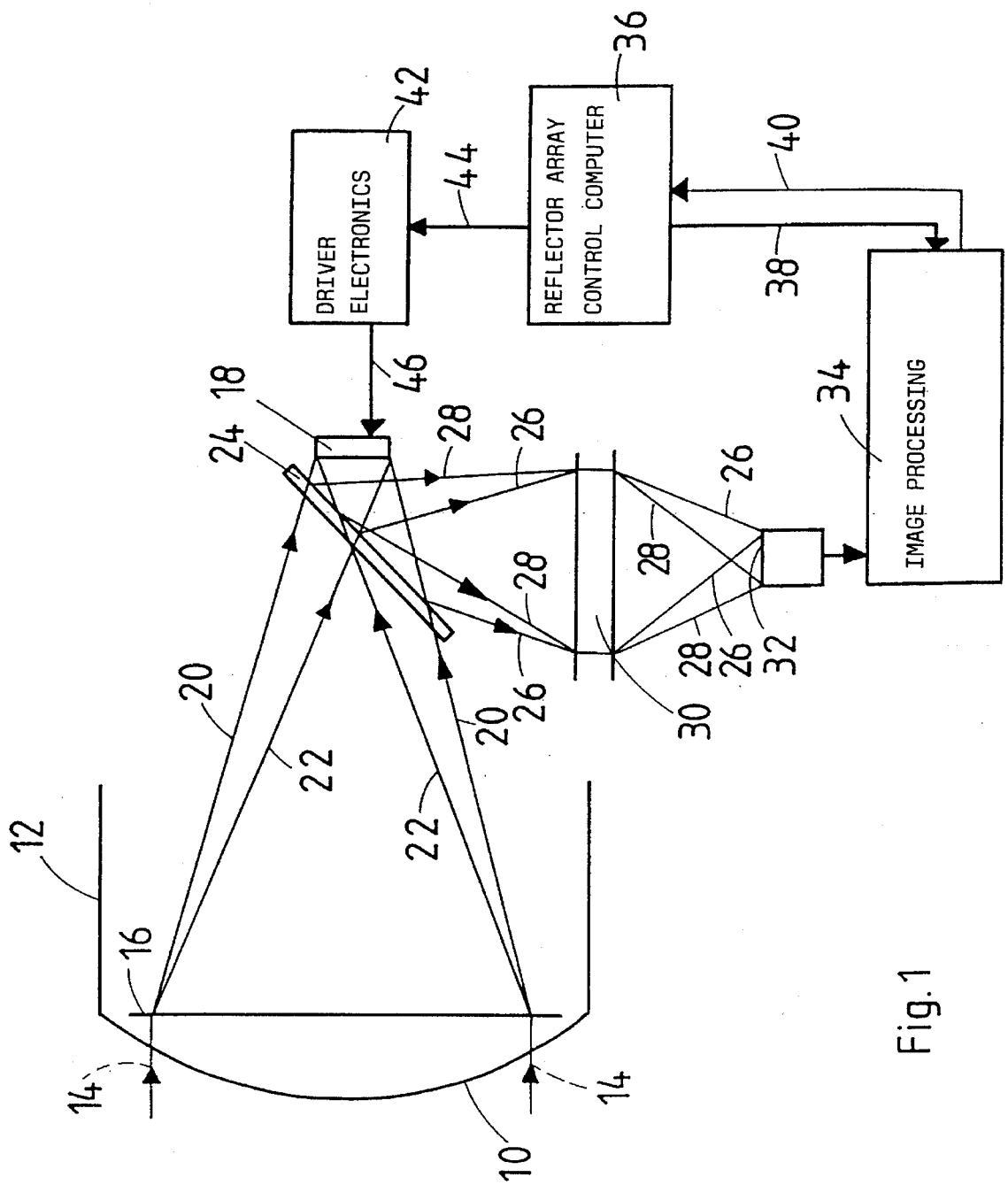
FIG. 1 is a schematic illustration of a seeker head for a target tracking missile wherein an exemplary embodiment of the inventive passive picture-resolving detector assembly is used.

Describing now the drawings, it is to be understood that only enough of the construction of the passive picture-resolving detector assembly has been shown as needed for those skilled in the art to readily understand the underlying principles and concepts of the invention while simplifying the showing of the drawings. Referring now specifically to FIG. 1, reference numeral 10 therein designates a dome transparent to infrared radiation at the tip of a missile 12. Infrared radiation from an object scene located at infinity passes through the dome. This infrared radiation is represented by rays 14. A first imaging optical system 16 is arranged behind the dome. The optical system generates a high-resolution intermediate image of the object scene on a micro-mechanical mirror array 18. Numerals 20 and 22 designate peripheral rays of the imaging beams. A partially transparent mirror 24 is provided in the path of rays of the imaging optical system 16. The partially transparent mirror 24 is inclined at an angle of 45° with respect to the optical axis of the imaging optical system 16. The infrared radiation specularly reflected by the mirror array 18 is partially reflected by the partially transparent mirror as a divergent beam with peripheral rays 26 and 28. The path of rays is deflected by 90° by the partially transparent mirror 24. A second imaging optical system 30 images the micro-mechanical mirror array 18 on a matrix detector 32. The second imaging optical system 30, thereby, also generates an image of the object scene to the extent, to which the mirror elements reflect the incident light specularly with respect to the plane of the mirror array.

The signals from the matrix detector 32 are supplied to a picture processing computer 34. The picture processing computer combines the successively appearing picture data of the matrix detector to compose an electronic "picture" of high resolution. The picture thus obtained is processed in conventional manner for target identification and for generating target deviation data. This is not the subject of this invention and, therefore, is not described in detail here. Numeral 36 designates a control computer for controlling the micro-mechanical mirror array 18. This control computer determines which of the mirror elements of the mirror array 18 are in their first operative positions and which of the mirror elements are in their second operative positions. If a resolution as high as possible is required, the control computer 36 energizes the mirror elements in such a way that, in each sub-matrix of the mirror array 18, the individual mirror elements are moved in cyclic succession successively into their second operative states, while all respective remaining mirror elements of the sub-matrix remain in their first states.

In this second operative position, the mirror element lies in the plane of the mirror array 18 and reflects incident rays into the path of rays represented by peripheral rays 26, 28. The mirror elements remaining in their first operative positions reflect incident rays such that the reflected rays do not reach the matrix detector 32. The control computer 36 supplies to the picture processing computer 34 information about which mirror elements are presently in their second operative positions. On the basis of this information, the picture processing computer 34 can compose the electronic "picture" of the object scene. This information about the mirror elements moved to their second operative position is represented in FIG.1 by a connection 38.

From the picture processing, the necessity might arise to deviate from this normal mode of operation. For example, it may be necessary to increase the intensity of the signals provided by the detector elements, even at the cost of reduced resolution. In this case, the control computer 36, instead of energizing the mirror array 18 to move one mirror element of each sub-matrix at a time into its second operative position, can energize the mirror array 18 to move more than one mirror element of each sub-matrix, for example four adjacent mirror elements, simultaneously into their second operative positions. A command to this effect is applied to the control computer 36 by the picture processing computer 34 through a connection 40. Thus the resolution of the system can easily be adapted to the needs of the respective situation.

The control computer 36 controls a driver electronic system 42. This is illustrated by a connection 44. The driver electronic system 42 provides the energization signals for energizing the micro-mechanical mirror system. This is illustrated by a connection 46.

Figure 2:
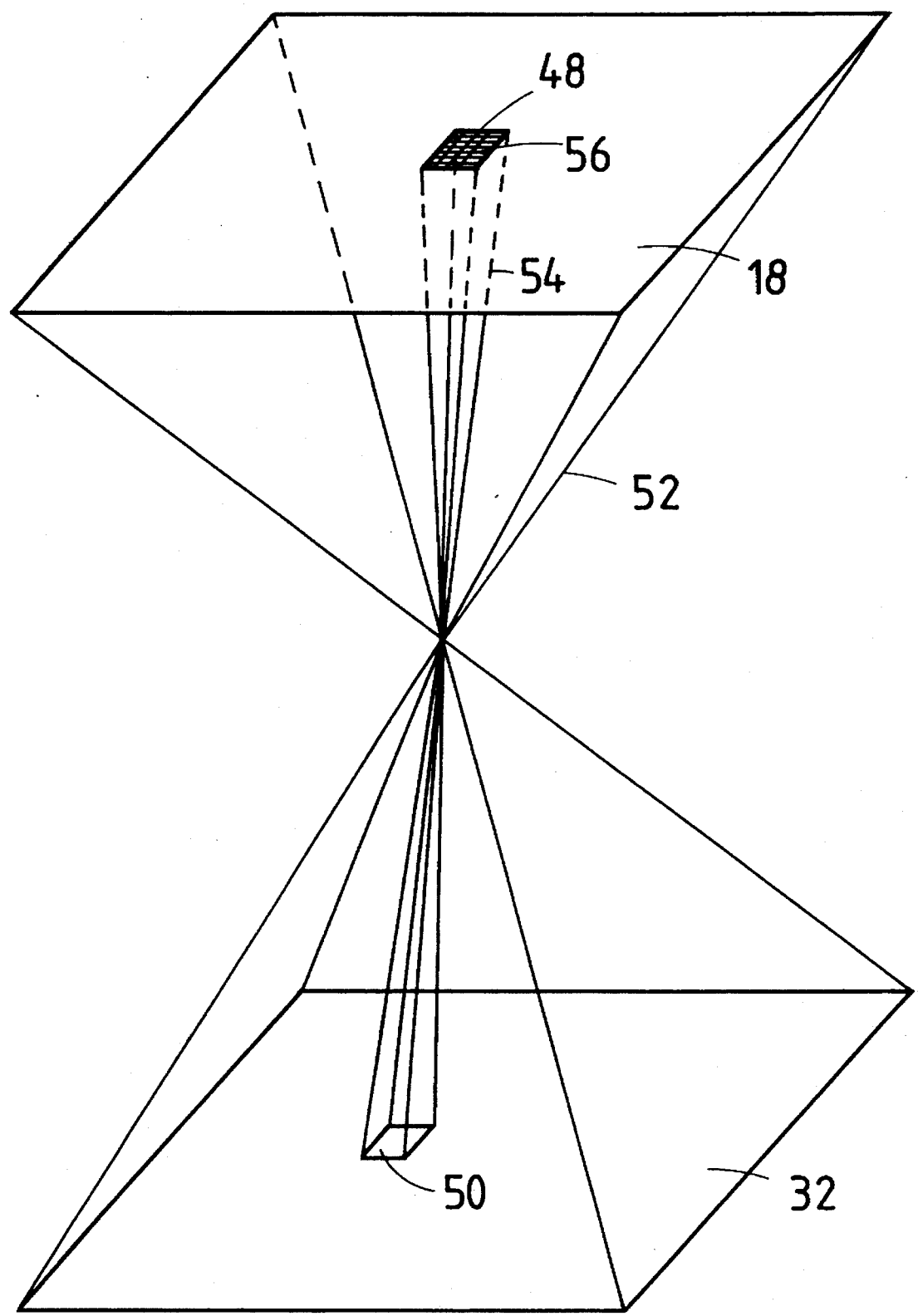
FIG. 2 schematically illustrates the cooperation of a sub-matrix of the micro-mechanical mirror array with a detector element of the matrix detector in the detector assembly as shown in FIG. 1.

FIG.2 schematically shows the relation between a sub-matrix 48 of the micro-mechanical mirror array 18 and an associated detector element 50 of the matrix detector 32. The complete mirror array is imaged on the complete matrix detector 32, as indicated by the peripheral rays 52. The sub-matrix 48 of the micro-mechanical mirror array 18 is imaged on the detector element 50 such that the image of the whole sub-matrix 48 fills the area of the detector element 50. This is indicated by the peripheral rays 54. In the example shown in FIG. 2, the sub-matrix consists of 4×4 mirror elements 56. Each of the sixteen mirror elements 56 of the sub-matrix 48 reflects, when it is in its second operative position, incident rays such that they are focused by the second imaging optical system on the detector element 50. In their first operative positions, the mirror elements 56 reflect incident rays out of the path of rays of the second imaging optical system.

The control computer may, for example, operate to move in cyclic succession successively the four mirror elements "11", "12", "13" and "14" of the first row into their second operative positions, if the mirror elements 56 of the sub-matrix 48 are characterized by giving their rows and columns. Then successively the mirror elements "21", "22", "23" and "24" of the second row are moved into their second operative positions, etc, up to the mirror element "44" of the last row and last column. Then this cycle is repeated. This mode of energization yields optimum resolution. The mirror array may, however, also be energized in such a way that, during a first clock interval of each cycle, the mirror elements "11", "12", "21" and "22" are moved into their second operative positions simultaneously; in a second clock interval the mirror elements "13", "14", "23" and "24" are moved into their second operative positions etc. Thereby, the matrix detector provides a higher signal level at the costs of reduced resolution. In addition, the scan is faster. This is commanded by the picture processing computer 34 depending on the results of the picture processing.

Figure 3:
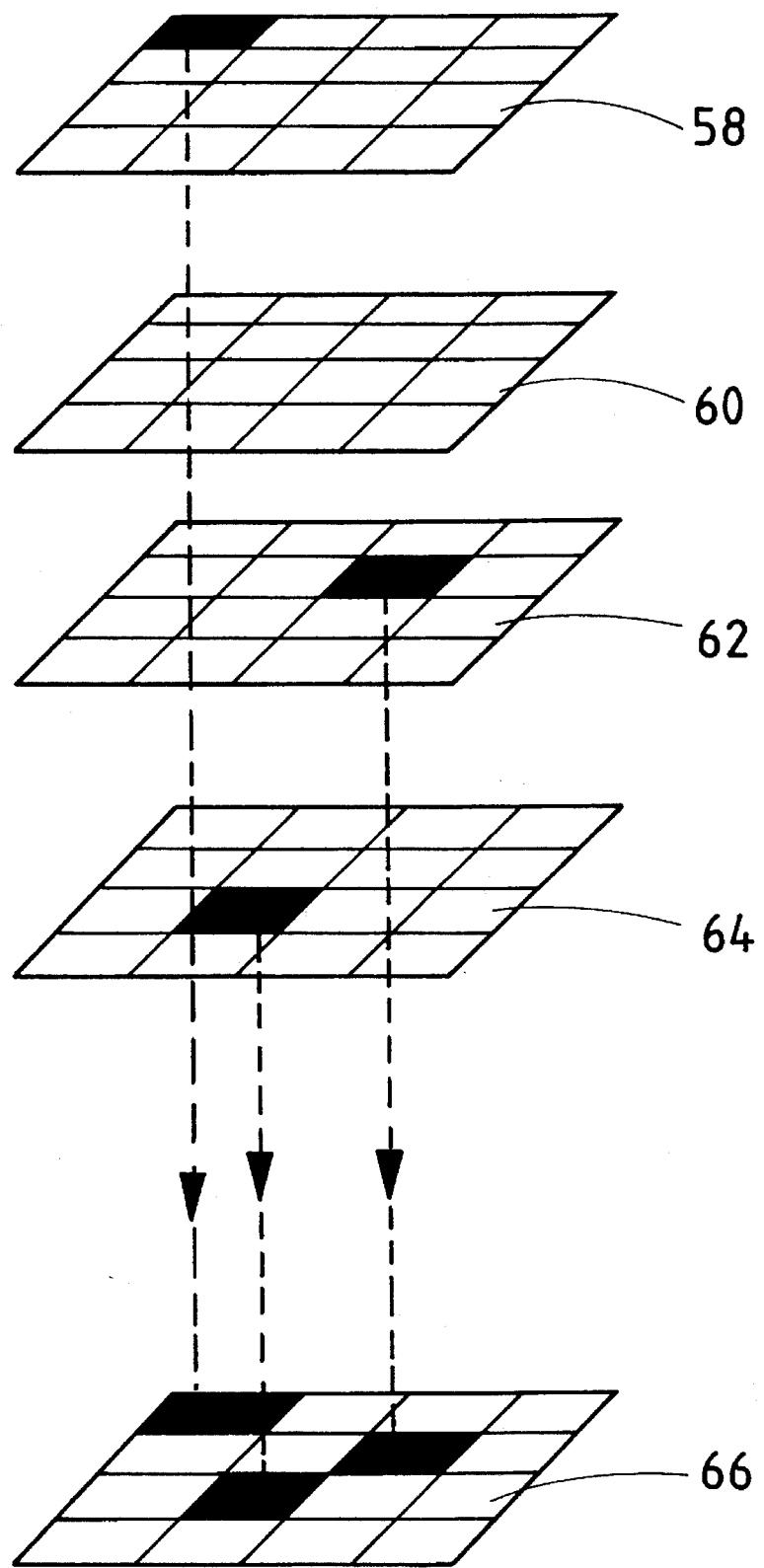
FIG. 3 schematically illustrates the manner in which the picture data obtained consecutively by means of a single detector element through the mirror elements of a sub-matrix of the mirror array are composed in the computer to form a high-resolution "picture".

FIG. 3 illustrates, how an electronic "picture" of high resolution is composed by the picture processing computer 34 from the signals of the matrix detector 32, which signals are obtained successively during a cycle of a sub-matrix 48 of the mirror array 18.

The control computer 36 indicates the respective row and column of that mirror element 48 which is to be moved into its second operative position. FIG. 3 illustrates, one on top of the other, the partial pictures which the picture processing computer generates on the basis of the state data of the mirror elements as received through connection 38, i.e. the rows and columns of the mirror elements being in their second operative positions, and of the signal of the detectoe element 50.

The control computer 36 indicates as row and column "11". This means that the mirror element of the first row and the first column is in its second operative position and reflects incident rays into the path of rays of the imaging optical system. It is assumed here that the detector element 50 provides a signal. This signal in digitized form may represent a brightness value. For simplicity, only the alternatives of "signal" (black) or "no signal" (white) are represented in FIG. 3. In the first electronic partial picture 58 of 4×4 divisions, as generated by the picture processing computer, the division "11" in the left top corner is "black". In the picture processing computer, this is represented, for example, by a logic "1". The remaining divisions are white. In the picture processing computer, this is represented by a logic "0" in all divisions.

During the next clock interval, the mirror element "12" is moved into its second operative position. No infrared radiation from the object scene impinges upon the mirror element "12". Thus the mirror element "12" will not direct infrared radiation to the detector element 50. The detector element 50 provides no signal. The whole partial picture 60 is white. In the picture processing computer 34, this is represented by a logic "0" in all divisions.

The partial pictures which are obtained during subsequent clock intervals and which are associated with the mirror elements "13", "14", "21" and "22" provide similar patterns.

When, during the next clock interval the mirror element "23" is moved into its second operative position, then the detector element provides a signal again. In the partial picture 62, the division in the second row and the third column is black. In the picture processing computer 34, this is represented by a logic "1".

Then there will be partial pictures which are white throughout, until the mirror element "32" in the third row and the second column is energized. If this mirror element is moved into its second operative position, then the detector element 50 again receives infrared radiation and provides a signal. In the associated partial picture, the division "32" is black. In the picture processing computer, this is represented by a logic "1".

It should be noted, that each of the partial pictures, in turn, is part of a total pattern which is provided by the various sub-matrices and detector elements. The picture processing computer 34 superimposes the total patterns composed of the partial pictures to an electronic "picture" of the object scene. For the partial pictures provided by the sub-matrix 48 and the detector element 50 this results in a superposition picture 66.

While there are shown and described present preferred embodiments of the invention, it is to be distinctly understood that the invention is not limited thereto, but may be otherwise variously embodied and practiced within the scope of the following claims. Accordingly,

What I claim is:

1. A passive, picture-resolving detector assembly comprising a matrix detector (32) and imaging optical means (16,30) for forming an image of an object scene on said matrix detector, said matrix detector including a two-dimensional array of detector elements (50), each of said detector elements (50) being arranged to receive, in cyclic succession, a plurality of picture elements of said image, in order to improve resolution,
characterized in that (a) a micro-mechanical mirror array (18) having a two-dimensional array of mirror elements (48) is provided, each of said mirror elements (48) being controllably, alternatively movable into a first operative position and into a second operative position, (b) said imaging optical means comprise a first imaging optical system (16) having a beam axis and forming a high-resolution image of said object scene on said micro-mechanical mirror (18), (c) said imaging optical means, furthermore, comprise a second imaging optical system (30) imaging said micro-mechanical mirror array (18) on said matrix detector (32) such that each detector element (50) receives light from an associated sub-matrix (48) of said micro-mechanical mirror array (18), each such associated sub-matrix (48) including a plurality of mirror elements (56), (d) said mirror elements (56) are arranged to reflect, in said first operative position thereof, light directed thereon by said first imaging optical system (16) to pass by said matrix detector (32) and to reflect, in said second operative position thereof, said light directed thereon by said first imaging optical system onto the respective associated detector element (50) of said matrix detector, and (e) said micro-mechanical mirror array (18) is controlled to move, in cyclic succession, each of said mirror elements (56) successively into said second operative position, the respective remaining mirror elements (56) of each sub-matrix (48) being in their first operative positions.

2. The detector assembly as defined in claim 1, further including a partially transparent mirror (24) provided in the path of rays of the first imaging optical system at an angle with respect to said beam axis thereof, light from said first imaging optical system passing through said partially transparent mirror to form said high-resolution image on said micro-mechanical mirror array (18), said second imaging optical system being arranged to receive light reflected by said micro-mechanical mirror array and said partially transparent mirror to form an image on said matrix detector (32).

3. The detector assembly as defined in claim 1, wherein said matrix detector (32) responds to infrared radiation.

4. The detector assembly as defined in claim 2, wherein said matrix detector (32) responds to infrared radiation.

5. The detector assembly as defined in claim 1, further including a target seeker for a target tracking missile in which is mounted the passive, picture-resolving detector assembly for detecting a target in said object scene.

* * * * *